Figure 1:
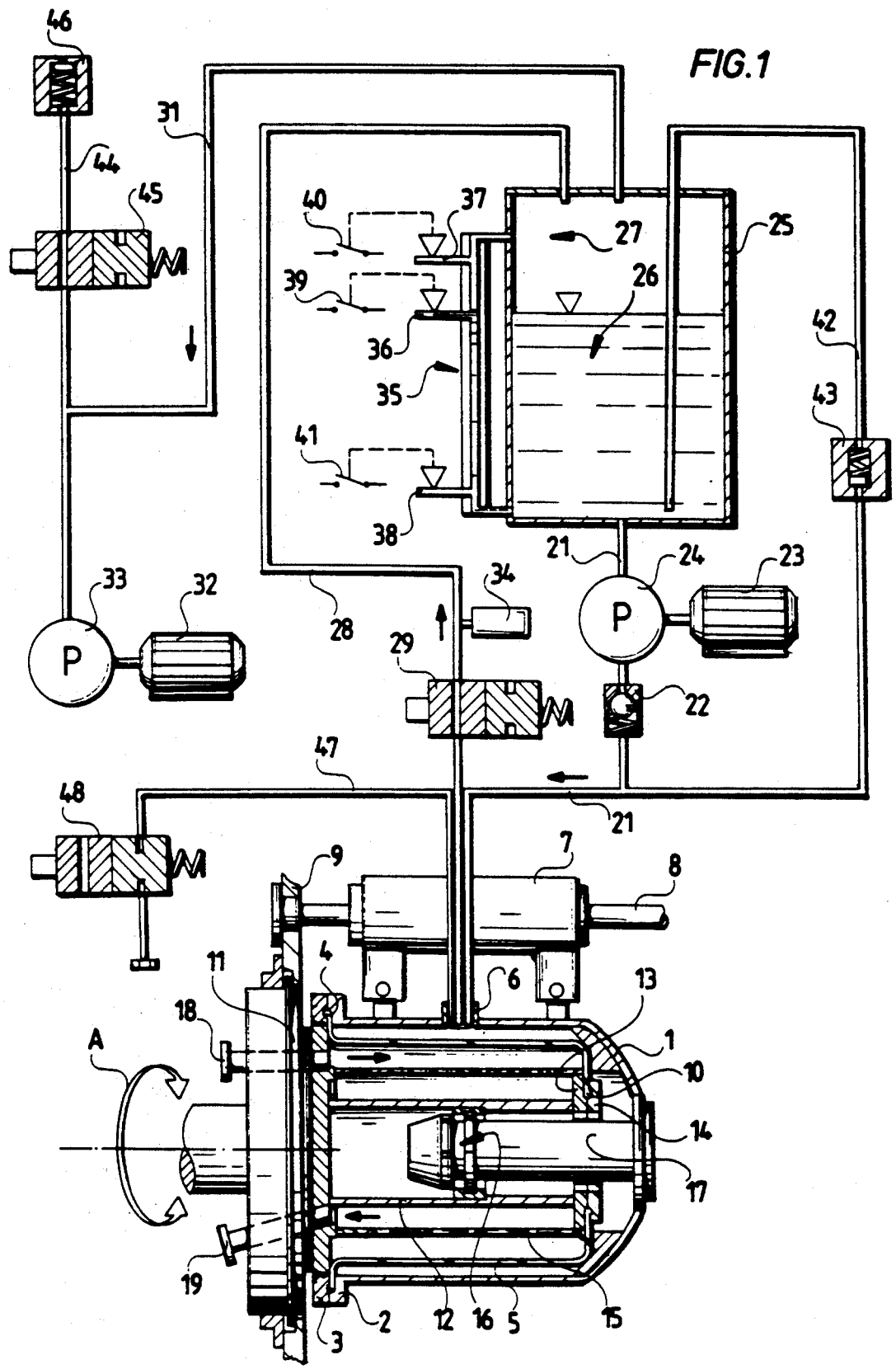

United States Patent
Gerteis

[11] Patent Number: 5,244,567
[45] Date of Patent: Sep. 14, 1993

[54] PRESSURE FILTER WITH MEANS TO DETECT BREAK IN PRESSURIZING MEMBRANE

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 671,775
[22] PCT Filed: Aug. 10, 1989
[86] PCT No.: PCT/EP89/00943
§ 371 Date: Apr. 17, 1992
§ 102(e) Date: Apr. 17, 1992
[87] PCT Pub. No.: WO90/05013
PCT Pub. Date: May 17, 1990

[30] Foreign Application Priority Data
Nov. 10, 1988 [DE] Fed. Rep. of Germany ....... 3838108

[51] Int. Cl.⁵ .............................................. B01D 29/00
[52] U.S. Cl. ......................................... 210/86; 100/53; 100/211; 210/104; 210/106; 210/130; 210/350; 417/9
[58] Field of Search .................. 210/85, 86, 103, 104, 210/106, 130, 350, 351, 370, 380.3, 407, 408, 791; 100/43, 53, 211; 417/2, 9, 379, 386

[56] References Cited
U.S. PATENT DOCUMENTS

| | | | |
|---|---|---|---|
| 3,180,825 | 4/1965 | Couvreur et al. | 210/350 |
| 3,279,604 | 10/1966 | Leviel | 210/104 |
| 3,974,074 | 8/1976 | Purdey | 210/350 |
| 4,116,831 | 9/1978 | Keat | 210/808 |
| 4,193,874 | 3/1980 | Gerteis | 210/370 |
| 4,269,711 | 5/1981 | Gerteis | 210/380.3 |
| 4,533,472 | 8/1985 | Verri et al. | 210/350 |
| 4,702,831 | 10/1987 | Gerteis | 210/408 |
| 4,707,256 | 11/1987 | Gerteis | 210/408 |
| 4,802,978 | 2/1989 | Schmit et al. | 210/521 |

Primary Examiner—Joseph W. Drodge
Attorney, Agent, or Firm—Shenier & O'Connor

[57] ABSTRACT

A pressure filter for suspensions comprises a boiler shaped outer shell (1) the front side of which is closed by a detachable lid (11), a tubular filter element (15) which projects from the lid, a membrane (5) which can be inverted arranged coaxially between the outer shell and the filter element, and a suction and pressure joint (6) arranged on the outer shell. A device for operating the filter comprises a container (25) for a hydraulic fluid (26) which fills the lower part of the container, a gas space (27) to being located above the level of the hydraulic fluid. A first line (21) with a force pump (24) conveys the hydraulic fluid from the lower part of the container to the space between the outer shell and the membrane. A second line (28) connects the space between the outer shell and the membrane with the gas space in the container and communicates with a suction pump (33). A level sensor on the container detects when the interface between hydraulic fluid and gas in the container is at an abnormal level, indicative of conditions caused by a leak in the membrane and can shutdown the pumps.

7 Claims, 2 Drawing Sheets

PRESSURE FILTER WITH MEANS TO DETECT BREAK IN PRESSURIZING MEMBRANE

The invention relates along a device for operating a pressure filter for suspensions comprising a boiler-shaped outer casing, a lid releasably closing the outer casing at its open end, a tubular filter element projecting from the lid coaxially to the axis of the outer casing, an invertable membrane arranged coaxially between the outer casing and the filter element and a suction and pressure pipe connection on the outer casing.

A pressure filter of this type is known from DE-A-3517032. During operation of the filter, an overpressure or a vacuum acting on the membrane can be generated via the suction and pressure connection pipe provided on the outer casing of the filter. In this respect, the overpressure can be generated with the aid of a fluid pressure medium and the vacuum with the aid of a vacuum pump. If the membrane is porous, there is the risk of toxic suspension possibly passing into the fluid pressure medium or into the open air via the vacuum pump which can cause harm to people and the environment.

It is true that DE-A-2703598 discloses a pressure supply unit for a pressure filter, however no measures are provided therein for making use of the pressure supply unit for control operations, e.g., in case of a porous membrane.

The object of the invention is to design a generic device in such a way that porosities of the membrane can be detected and the escape of suspension into the environment is prevented even with a porous membrane.

According to the invention, the object is accomplished by the following features:

A. a container for a fluid pressure medium, the pressure medium filling the lower part of the container and a gas space is available in the container above the liquid level of the pressure medium;

B. a first line for transferring pressure medium from the lower part of the container into the space between outer casing and membrane of the pressure filter;

C. a pressure pump in the first line;

D. a second line connecting the space between outer casing and membrane of the pressure filter with the gas space of the container;

E. a suction pump for generating a vacuum in the gas space of the container;

F. A fluid level indicator on the container;

G. Adjustable sensing elements for sensing predetermined fluid levels in the container; and H. Switches connected with the sensing elements, these switches reacting when the predetermined fluid levels are reached and triggering control procedures for the pressure filter, especially a switching-off of the pumps.

Figure 2:
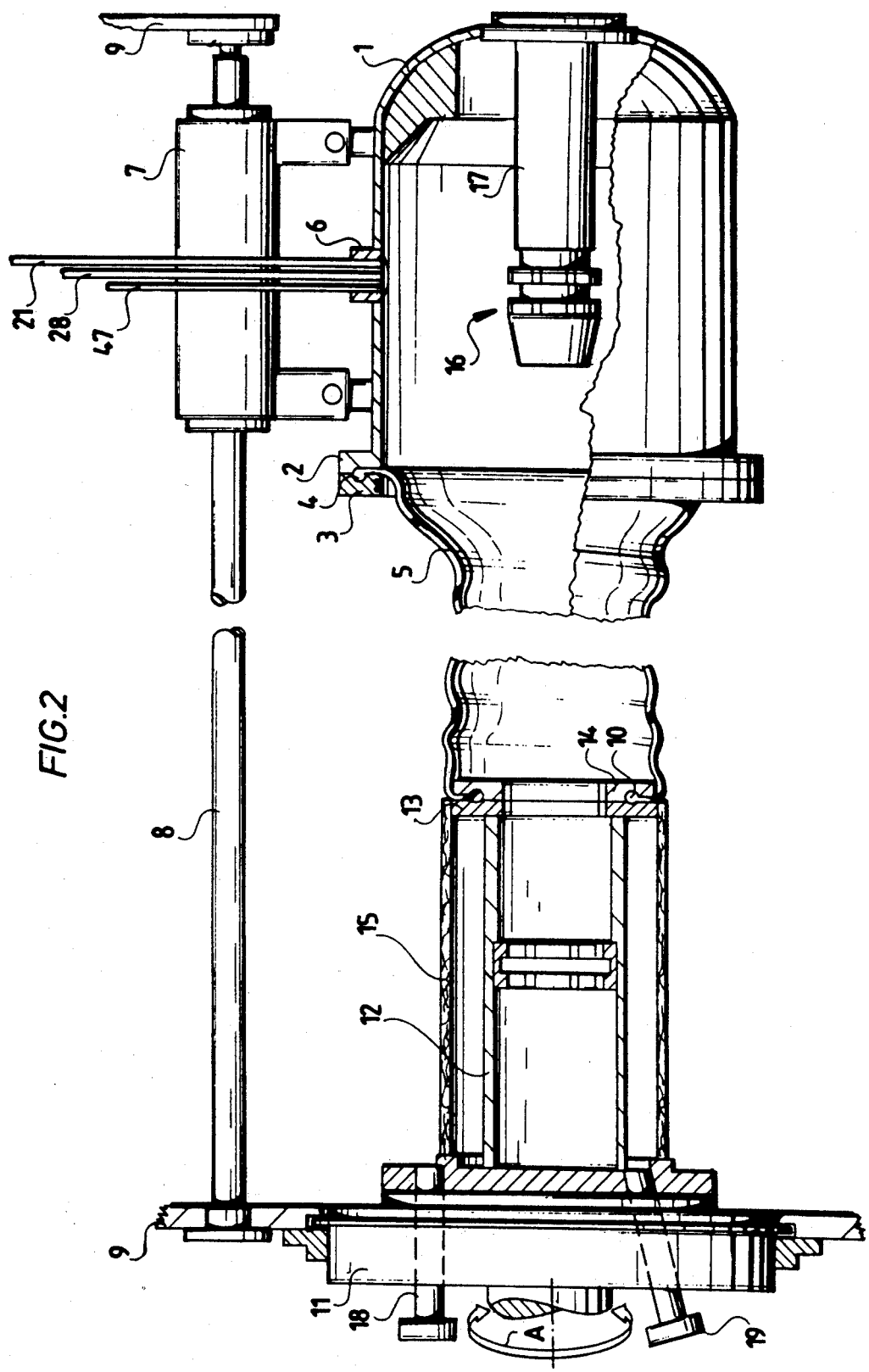

The following description of preferred embodiments of the invention serves, in conjunction with the attached drawings, to explain the invention further. In the drawings:

FIG. 1 shows a pressure filter in the closed state with a device for operating the filter and FIG. 2 shows the filter of FIG. 1 in the opened state.

The pressure filter illustrated in the drawings comprises a boiler-shaped outer casing 1 which has a circular cross section, is closed at one end face (to the right in FIGS. 1 and 2) and open at its opposite end face. At its open end face the outer casing 1 bears a circumferential flange consisting of two parts 2, 3, between which one edge region 4 of a tubular membrane 5 consisting of elastically flexible material is securely clamped. A suction and pressure connection pipe 6 projects upwards from the outer casing 1. The outer casing 1 is also releasably connected via a supporting structure with a bushing 7 which is displaceable on a stationary bar 8 parallel to the axis of the outer casing.

A lid 11 for sealingly closing the open end face of the outer casing 1 is rigidly or rotatably mounted in a stationary machine frame 9 bearing the bar 8. A tube 12 projects rigidly from the inner side of the lid 11 facing the outer casing 1. This tube bears on its free end a flange which consists of two parts 13, 14 in a similar manner to the flange on the open end face of the outer casing 1. The other edge 10 of the membrane 5 is securely clamped between these parts 13, 14.

A tubular filter element 15 extends between the inner side of the lid 11 and the flange part 13. This element is designed, for example, like a screen drum covered by a filter cloth. The filter element 15 abuts in a sealing manner on the inner side of the lid 11 and on the flange part 13, respectively.

In the closed state of the filter (FIG. 1) the tubular membrane 5 extends coaxially between the inner side of the outer casing 1 and the outer side of the filter element 15. In the opened state of the filter (FIG. 2), when outer casing 1 and lid 11 are withdrawn from one another in the direction of their common axis by displacement of the bushing 7 on the rod 8, the membrane 5 has been inverted or turned inside out in relation to the arrangement of FIG. 1 so that the inner side of the membrane has now become its outer side.

During the actual filtering process, the pressure filter is closed (FIG. 1). In this respect, the outer casing 1 is securely connected with the lid 11 via a bayonet closure 16 which is located in the interior of the tube 12 and partially borne by an arm 17 projecting inwards from the closed end face of the outer casing 1. By applying a vacuum to the connection pipe 6, the membrane 5 can take up approximately the position illustrated in FIG. 1 so that suspension to be filtered can be introduced via a supply line 18 provided on the lid 11. Once the filling process has terminated, the membrane 5 can be pressed against the filter element 15 by applying overpressure to the connection pipe 6 in order to urge the residual fluid through the filter element. The solid components of the suspension remain on the filter element 15 as a filter cake while the filtrate urged through the filter element 15 flows off via a discharge line 19 also provided on the lid 11. In the opened state of the filter (FIG. 2) the filter cake can be removed from the filter element 15.

Following termination of a filtering process, the pressure filter can be cleaned. For this purpose, the membrane 5 is, in the closed state of the filter, lifted off the filter element 15 again by a vacuum and can hereby be pressed firmly against the inner side of the outer casing 1. Washing fluid can be introduced via the discharge line 19 for flushing back the filter element 15. After the washing process the washing fluid can be squeezed out by pressing the membrane 5 which is subject to overpressure against the filter element 15.

When the lid 11 of the pressure filter is rotatably mounted, the filter can be rotated back and forth in the direction of double-headed arrow A during the filtering process to ensure an even formation of the filter cake. When the filter cake is discharged in the opened state of the filter (FIG. 2), the lid 11 can also be pivoted back and forth in the direction of the double-headed arrow A to assist the discharge of the filter cake.

An overpressure is generated on the membrane 5 by introducing a fluid pressure medium into the space between outer casing 1 and membrane 5. For this purpose, as illustrated schematically in FIG. 1, the connection pipe 6 is connected with a first line 21 which is connected via a nonreturn valve 22 with the pressure side of a high-pressure pump 24 driven by an electromotor 23. The suction side of the pump 24 is connected via an additional section of the line 21 with the lower side of a container 25 which holds a fluid pressure medium 26, e.g. water or oil. The fluid pressure medium 26 only fills the lower part of the container 25 so that a gas space 27 is present in the container above the fluid level of the pressure medium.

A second line 28 is, as indicated schematically in FIG. 1, connected on the one hand with the pressure connection pipe 6 and, on the other, with the gas space 27 of the container 25. The line 28 contains a shutoff valve 29 which is preferably remote controlled and can be selectively brought into an open or closed position. An additional line 31 is connected on the one hand with the gas space 27 of the container 25 and, on the other, with a suction or vacuum pump 33 driven by a motor 32 so that gas, for example air, can be sucked from the gas space into the open air.

When, during the filtering process, a pressure is intended to be exerted on the membrane 5, fluid pressure medium 26 from the container 25 is urged by the pump 24 via the line 21 into the space between outer casing 1 and membrane 5 so that the membrane 5 is brought closer to the filter element 15 and fluid is pressed through this filter element. Before the pressure filter is moved from its closed into its opened state (FIG. 2) the pressure pump 24 is switched off and the suction pump 33 started. This suction pump pumps the gas out of the gas space 27 so that the fluid pressure medium flows back into the container 25 from the space between outer casing 1 and membrane 5 via the line 28. The membrane 5 is released from the filter element and once a vacuum is present in the space between outer casing 1 and membrane 5 it abuts on the inner side of this casing.

When, during operation of the pressure filter, the membrane 5 becomes porous, e.g. after a lengthier operating time, and toxic suspension possibly passes into the space between outer casing 1 and membrane 5 where it mixes with the fluid pressure medium 26, it is ensured that this mixture does not pass into the surrounding environment but, at the most, into the container 25 where it cannot cause any harm. A sensor 34 for measuring the change (soiling) of the fluid pressure medium 26 can be arranged at the second line 28. The sensor 34 reacts when suspension to be filtered has passed into the fluid pressure medium 26 due to the fact that the membrane 5 has become porous.

As indicated schematically in FIG. 1 in addition, a conventional fluid level indicator 35 is arranged on the container 25 and this shows the level of the fluid pressure medium 26 in the container 25. The fluid level indicator 35 comprises in a manner known per se adjustable sensing elements 36, 37, 38 which sense predetermined fluid levels in the container 25. The sensing elements 36, 37, 38 are, as indicated only schematically in FIG. 1, connected with switches 39, 40 and 41, respectively, which respond when the relevant fluid level is reached and trigger control procedures.

The sensing element 36 connected with the switch 39 indicates the normal level of the fluid pressure medium in the container 25. The sensing element 37 which is arranged a predetermined amount above the normal fluid level and connected with the switch 40 reacts when the fluid level is higher than the normal fluid level in a predetermined manner. The normal fluid level is given when the entire amount of the fluid pressure medium contained in the system is located in the container 25. The switch 40 is designated as "maximum switch" and responds, when the suction pump 33 is running, when suspension to be filtered has passed into the fluid pressure medium due to a break in the membrane. The suction pump 33 can then be switched off by the switch 40 and saved from damage.

The sensing element 38 connected with the switch 41 is arranged at a predetermined amount beneath the normal fluid level so that the switch 41 acts as a minimum switch and reacts when the fluid level is lower than the normal fluid level in a predetermined manner. This means that a break in the membrane can be detected when the high-pressure pump 24 is running because fluid pressure medium then passes into the suspension through the damaged membrane and flows off with the suspension via the discharge line 19. In this case, the motor 23 of the high-pressure pump 24 can be switched off via the switch 41.

When, with the high-pressure pump 24 running, fluid pressure medium is pressed into the space between outer casing 1 and membrane 5, the shutoff valve 29 in the line 28 is closed. As also shown in FIG. 1, the first line 21 is connected behind the pump 24 and via a bypass line 42 with the lower part of the container 25 filled with fluid pressure medium. The bypass line 42 contains an overpressure valve 43 which opens when the pressure in the first line and, therefore, in the space between outer casing 1 and membrane 5 exceeds a predetermined value. This means that an inadmissibly high pressure in the space between outer casing 1 and membrane 5 can be avoided. The overpressure valve 43 can be adjusted in a manner known per se to predetermined pressure values, at which it opens.

The line 31 is connected with a line 44 which contains, one after the other, a shutoff valve 45 which is, for example, remote-controlled as well as a vacuum valve 46 which is preferably adjustable. The vacuum valve 46 opens into the atmosphere. When the valve 45 is in its open position (illustrated in FIG. 1), the pressure in the gas space 27 can be adjusted to a predetermined value with the aid of the vacuum valve 46 when the suction pump 33 is running.

To move the pressure filter from the closed state (FIG. 1) into its opened state (FIG. 2), compressed air is applied to the space between the outer casing 1 and the membrane 5 after the bayonet closure 16 has been released. For this purpose, a line 47 opens, in addition to the lines 21 and 28, into the suction and pressure connection pipe 6 and can be connected when required via a remote-controlled shutoff valve 48 with a compressed air source (which is not illustrated).

It is expedient, when moving the pressure filter from the opened state (FIG. 2) into the closed state (FIG. 1), to apply underpressure or vacuum to the connection pipe 6 via the line 28 in the manner described as this makes it easier to turn the membrane 5 inside out. It is appropriate, when closing the pressure filter, not to apply the full suction or vacuum pressure to the connection pipe 6 but rather a lesser pressure which merely allows the filter 5 to be turned in more easily. The full vacuum or suction pressure is not switched in until the final phase of the closure process, when the outer casing 1 reaches over the radial seals provided in the lid 11, is reached.

I claim:

1. Device for operating a pressure filter for suspensions comprising a boiler-shaped outer casing, a lid releasably closing the outer casing at its open end face, a tubular filter element projecting from the lid coaxially along the axis of the outer casing, an invertable membrane arranged coaxially between the outer casing and the filter element and a suction and pressure pipe connection on the outer casing, characterized by the following features:
   A. a container (25) for a fluid pressure medium (26), the pressure medium filling the lower part of the container and a gas space (27) being available in the container above the liquid level of the pressure medium;
   B. a first line arranged (21) for transferring pressure medium (26) from the lower part of the container (25) into a space defined between the outer casing (1) and the membrane (5) of the pressure filter;
   C. a pressure pump (24) in the first line;
   D. a second line (28) connecting the space between the outer casing (1) and membrane (5) of the pressure filter with the gas space (27) of the container;
   E. a suction pump arranged (33) for generating a vacuum in the gas space (27) of the container (25);
   F. a fluid level indicator (35) on the container (25) comprising adjustable sensing elements (36, 37, 38) for sensing predetermined fluid levels in the container (25); and G. switches (39, 40, 41) connected with respective sensing elements (36, 37, 38), these switches reacting when the predetermined fluid levels are reached and triggering control procedures for the pressure filter, including a switching-off of the pumps (24, 33).

2. Device as defined in claim 1, characterized by the following additional feature the switches comprising:
   I. a maximum switch (40) responding when the fluid level is higher by a predetermined amount than a normal fluid level corresponding, for its part, to the amount of fluid pressure medium container in the container.

3. Device as defined in claim 1, characterized by the following additional feature the switches comprising:
   J. a minimum switch (41) responding when the fluid level is lower by a predetermined amount than a normal fluid level corresponding, for its part, to the amount of fluid pressure medium (26) contained in the container (25).

4. Device as defined in claim 1, characterized in that the first line (21) is connected via a bypass line (42) with the lower part of the container (25) filled with fluid, and the bypass line (42) includes an overpressure valve (43) opening when the pressure in the first line exceeds a predetermined value.

5. Device as defined in claim 4, characterized in that the overpressure valve (43) is adjustable to predetermined pressure values.

6. Device as defined in claim 1, characterized in that the suction pump (33) is selectively connectable via a pilot valve (45) with a vacuum valve (46) for adjusting the pressure in the gas space (27) to a predetermined value.

7. Device as defined in claim 1, characterized by a valve-controlled compressed air line arranged (47) for generating a positive air pressure in the space between outer casing (1) and membrane (5) of the pressure filter.

* * * * *

UNITED STATES PATENT AND TRADEMARK OFFICE
CERTIFICATE OF CORRECTION

PATENT NO. : 5,244,567

DATED : September 14, 1993

INVENTOR(S) : Hans Gerteis

It is certified that error appears in the above-identified patent and that said Letters Patent is hereby corrected as shown below:

In the Claims:

Claim 2, col. 6, line 9:

After the word "medium" change "container" to --contained--.

Signed and Sealed this

Twelfth Day of April, 1994

Attest:

BRUCE LEHMAN

Attesting Officer     Commissioner of Patents and Trademarks